United States Patent
Miyazaki et al.

(10) Patent No.: US 9,300,183 B2
(45) Date of Patent: Mar. 29, 2016

(54) ROTATING ELECTRIC MACHINE

(71) Applicant: HONDA MOTOR CO., LTD., Tokyo (JP)

(72) Inventors: Shogo Miyazaki, Wako (JP); Kentaro Nagahiro, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 168 days.

(21) Appl. No.: 14/014,355

(22) Filed: Aug. 30, 2013

(65) Prior Publication Data

US 2014/0064839 A1 Mar. 6, 2014

(30) Foreign Application Priority Data

Aug. 31, 2012 (JP) ................................ 2012-191220

(51) Int. Cl.
*H02K 7/00* (2006.01)
*H02K 51/00* (2006.01)
*H02K 7/08* (2006.01)

(52) U.S. Cl.
CPC ................ *H02K 7/003* (2013.01); *H02K 7/083* (2013.01); *H02K 51/00* (2013.01); *Y10T 403/7026* (2015.01)

(58) Field of Classification Search
None
See application file for complete search history.

(56) References Cited

U.S. PATENT DOCUMENTS 5,262,693 A * 11/1993 Holka ........................... 310/121
2008/0305910 A1* 12/2008 Brasile et al. ................. 475/220

FOREIGN PATENT DOCUMENTS

JP 4341577 B2 11/2006

OTHER PUBLICATIONS

Bearing Types and Application Design/Ball Bearings/Roller Bearings/Thrust Bearings. Datasheet [online]. Engineers Edge, 2015 [retrieved on Aug. 10, 2015]. Retrieved from the Internet: <URL: https://www.engineersedge.com/bearing_types.htm>.*

* cited by examiner

*Primary Examiner* — Daniel P Stodola
*Assistant Examiner* — Matthieu Setliff
(74) *Attorney, Agent, or Firm* — Mori & Ward, LLP

(57) ABSTRACT

A rotating electric machine includes an inner-circumferential-side shaft, an outer-circumferential-side shaft, and a rotor. The rotor is secured to the outer-circumferential-side shaft. The inner-circumferential-side shaft is rotatably supported by a bearing that is provided between a gear and the rotor. An outer circumference of the inner-circumferential-side shaft and an inner circumference of the outer-circumferential-side shaft are spline-fitted to each other at a spline-fitted portion. The outer-circumferential-side shaft has a loosely fitted portion that is provided on the inner circumference of the outer-circumferential-side shaft and that is fitted on the outer circumference of the inner-circumferential-side shaft with a first gap having a predetermined length provided between the loosely fitted portion and the outer circumference of the inner-circumferential-side shaft. The first gap is smaller than a second gap provided at the spline-fitted portion between the inner-circumferential-side shaft and the outer-circumferential-side shaft.

15 Claims, 4 Drawing Sheets

ROTATING ELECTRIC MACHINE

CROSS-REFERENCE TO RELATED APPLICATIONS

The present application claims priority under 35 U.S.C. §119 to Japanese Patent Application No. 2012-191220, filed Aug. 31, 2012, entitled "Rotating Electric Machine." The contents of this application are incorporated herein by reference in their entirety.

BACKGROUND OF THE INVENTION

1. Field of the Invention

The present application relates to a rotating electric machine.

2. Discussion of the Background

In a known rotating electric machine (for example, a motor), a rotor provided in the center of a stator is rotated with the generation of a rotating magnetic field by the use of a plurality of coils wound around slots of the stator. In such a motor, a hollow shaft is press-fitted into the center of the rotor, whereby the rotor is rotatable together with the shaft. Meanwhile, a rotating rod capable of transmitting power generated by an engine is fitted in the shaft (see Japanese Patent No. 4341577, for example).

SUMMARY OF THE INVENTION

According to one aspect of the present invention, a rotating electric machine includes an inner-circumferential-side shaft, an outer-circumferential-side shaft, and a rotor. The inner-circumferential-side shaft has a gear that is provided integrally therewith. The outer-circumferential-side shaft is provided on the outer circumferential side of the inner-circumferential-side shaft. The rotor is secured to the outer-circumferential-side shaft. The inner-circumferential-side shaft is rotatably supported by a bearing that is provided between the gear and the rotor. An outer circumference of the inner-circumferential-side shaft and an inner circumference of the outer-circumferential-side shaft are spline-fitted to each other at a spline-fitted portion. The outer-circumferential-side shaft has a loosely fitted portion that is provided on the inner circumference of the outer-circumferential-side shaft and that is fitted on the outer circumference of the inner-circumferential-side shaft with a first gap having a predetermined length provided between the loosely fitted portion and the outer circumference of the inner-circumferential-side shaft. The first gap is smaller than a second gap provided at the spline-fitted portion between the inner-circumferential-side shaft and the outer-circumferential-side shaft.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

DESCRIPTION OF THE EMBODIMENTS

Figure 1:
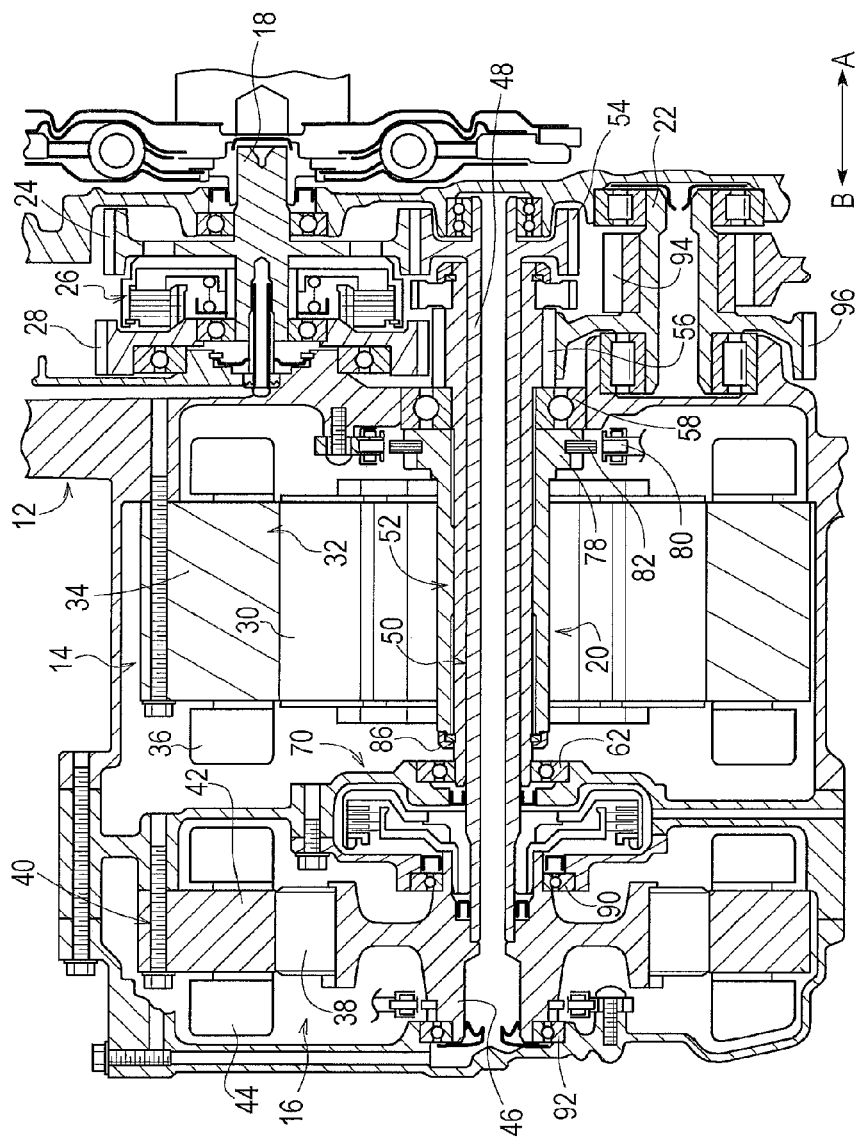
FIG. 1 is a partially omitted sectional view illustrating a vehicle-driving apparatus including a rotating electric machine according to an embodiment of the present application.

The embodiments will now be described with reference to the accompanying drawings, wherein like reference numerals designate corresponding or identical elements throughout the various drawings.

FIG. 1 illustrates a vehicle-driving apparatus 10 including a motor 14 as a rotating electric machine according to an embodiment of the present application.

As illustrated in FIG. 1, the vehicle-driving apparatus 10 includes a casing 12 connected to an end of an engine (not illustrated). The casing 12 houses the motor 14 and a generator 16. The casing 12 also houses an engine shaft 18, a motor-generator shaft 20, and an output shaft 22 that extend parallel to one another and are spaced apart from one another with predetermined gaps.

The engine shaft 18 is connected to the engine (not illustrated). Power generated by the engine is transmitted to the engine shaft 18. The engine shaft 18 has a first output gear 24 provided at substantially the center in the axial direction thereof (directions of arrows A and B) and a clutch 26 provided adjacent to the first output gear 24. When the clutch 26 is disengaged from the first output gear 24, the transmission of power to the output shaft 22 via a second output gear 28 provided at an end of the engine shaft 18 is stopped. When the clutch 26 is engaged with the first output gear 24, the power received by the engine shaft 18 is transmitted to the output shaft 22 via the clutch 26. The output shaft 22 is connected to a differential apparatus (not illustrated). The power is further transmitted to driving wheels via the differential apparatus.

The motor 14 includes a first rotor (rotor) 30 and a first stator 32. The first rotor 30 is secured to the outer circumference of an outer shaft (outer-circumferential-side shaft) 52 included in the motor-generator shaft 20. The first stator 32 is secured to the casing 12 and faces the outer circumference of the first rotor 30. The first stator 32 includes an annular stator core 34 and stator coils 36 wound around the stator core 34.

The generator 16 includes a second rotor 38 and a second stator 40. The second rotor 38 is provided substantially coaxially with the motor 14 in the axial direction (the directions of arrows A and B) of the motor-generator shaft 20 and is secured to the outer circumference of a generator shaft 46. The second stator 40 is secured to the casing 12 and faces the outer circumference of the second rotor 38. The second stator 40 includes an annular stator core 42 and stator coils 44 wound around the stator core 42.

Figure 2:
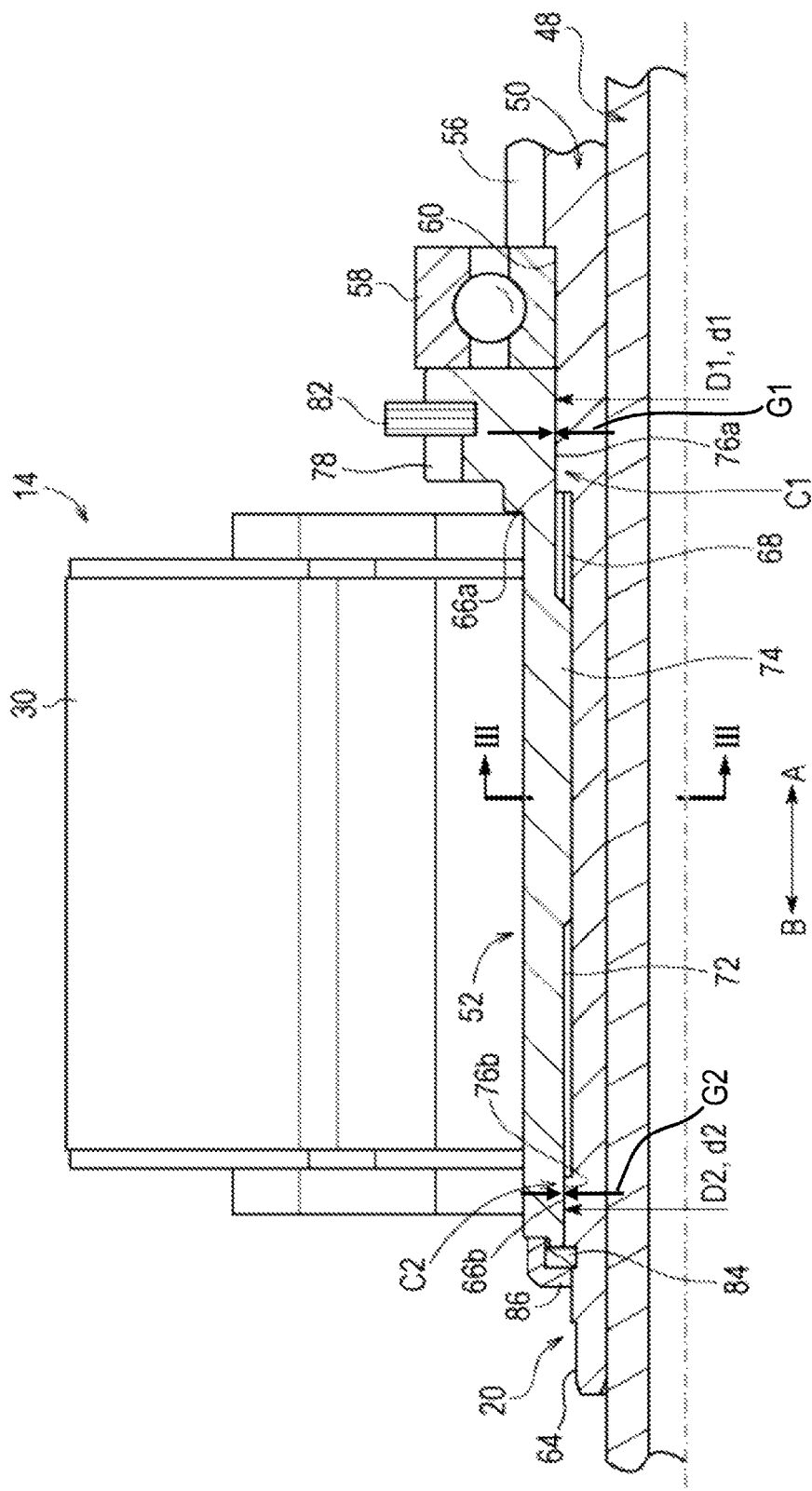
FIG. 2 is an enlarged sectional view illustrating a first rotor, a motor-generator shaft, and peripheral elements included in the rotating electric machine illustrated in FIG. 1.

As illustrated in FIGS. 1 and 2, the motor-generator shaft 20 includes a main shaft 48 an end of which is connected to the generator shaft 46, an inner shaft (inner-circumferential-side shaft) 50 in which the main shaft 48 is fitted, and the outer shaft 52 provided on the outer circumferential side of the inner shaft 50. The motor 14 is secured to the outer shaft 52. That is, the motor-generator shaft 20 includes the main shaft 48 provided on the innermost side thereof, and the inner shaft 50 and the outer shaft 52 that are coaxially provided in that order toward the outer circumferential side.

The main shaft 48 is a hollow rod having a through hole extending in the axial direction (the directions of arrows A and B). A first input gear 54 functioning as a generator-driving gear train is provided at an end of the main shaft 48 that is on a first side corresponding to an engine side (facing the direction of arrow A). The first input gear 54 is in mesh with the first output gear 24 provided on the engine shaft 18. The power that has been input to the engine shaft 18 is transmitted to the main shaft 48 via the first output gear 24, whereby the generator shaft 46 rotates together with the main shaft 48.

The inner shaft 50 is a hollow rod having a through hole extending in the axial direction (the directions of arrows A and B). The main shaft 48 is rotatably fitted in the inner shaft 50. A third output gear 56 is provided near an end of the inner shaft 50 that is on the first side corresponding to the engine side (facing the direction of arrow A). The third output gear 56 projects in the radial direction from the outer circumference of the inner shaft 50. The third output gear 56 is provided integrally with the inner shaft 50 and is in mesh with the second output gear 28 that is connected to the clutch 26. The inner shaft 50 has a first-bearing-supported portion 60 (see FIG. 2) supported by a first bearing 58 and a second-bearing-supported portion 64 (see FIG. 2) supported by a second bearing 62 (see FIG. 1). The first-bearing-supported portion 60 is provided on the outer circumference of the inner shaft 50 at a position on a second side (facing the direction of arrow B) with respect to the first output gear 24. The second-bearing-supported portion 64 is provided at an end of the inner shaft 50 that is on the second side. The first and second bearings 58 and 62 provided in the casing 12 support the first- and second-bearing-supported portions 60 and 64, respectively, whereby the inner shaft 50 is supported in such a manner as to be rotatable relative to the casing 12.

The inner shaft 50 also has a pair of a first mating part 66a and a second mating part 66b that are each provided on the outer circumference thereof at a position on a side nearer to the center than a corresponding one of the first- and second-bearing-supported portions 60 and 64. A diameter D1 (outside diameter) of the first mating part 66a provided on the first side (facing the direction of arrow A) of the inner shaft 50 is larger than a diameter D2 (outside diameter) of the second mating part 66b provided on the second side (facing the direction of arrow B) of the inner shaft 50 (D1>D2).

Figure 3:
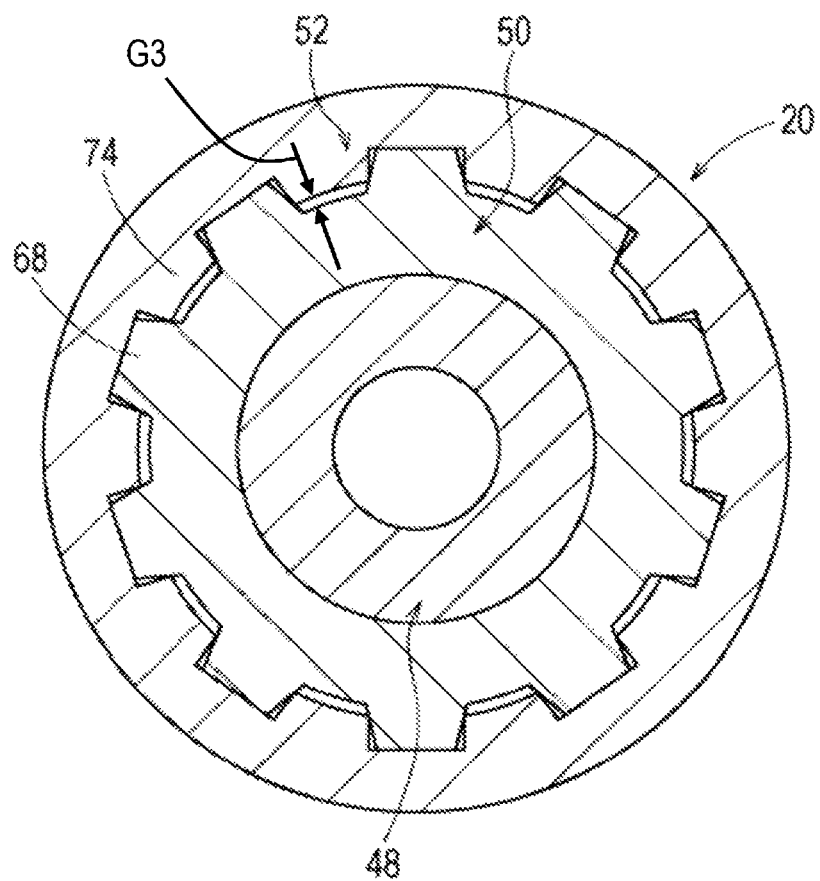
FIG. 3 is a sectional view taken along line illustrated in FIG. 2.

As illustrated in FIGS. 2 and 3, a first spline portion (spline-fitted portion) 68 is provided between the first mating part 66a and the second mating part 66b. The first spline portion 68 has, in the outer circumferential surface thereof, projections and recesses that are arranged alternately in the circumferential direction. The first spline portion 68 is in mesh with a second spline portion (spline-fitted portion) 74, to be described below, provided in the inner circumferential surface of the outer shaft 52, whereby the inner shaft 50 and the outer shaft 52 are movable in the axial direction (the directions of arrows A and B) while being prevented from rotating relative to each other about the axes thereof. That is, the inner shaft 50 and the outer shaft 52 always rotate together.

The tolerances for the diameters of the first mating part 66a and the second mating part 66b are set smaller than the tolerance for the diameter of the first spline portion 68.

Referring now to FIG. 1, a torque-limiting mechanism 70 is provided at an end of the main shaft 48 that is on the second side, which is opposite the engine side, and between the motor 14 and the generator 16. The power generated by the engine is transmitted to the generator 16 via the torque-limiting mechanism 70. When, for example, a torque that is larger than a predetermined value is input to the torque-limiting mechanism 70, the torque-limiting mechanism 70 adjusts a torque that occurs on the generator shaft 46 to a predetermined value or smaller. Hence, there is no chance that any torque that is larger than the predetermined value may occur on the generator shaft 46.

The outer shaft 52 is a hollow rod having a through hole 72 provided in the center thereof and extending in the axial direction (the directions of arrows A and B). The inner shaft 50 is fitted in the through hole 72, whereby the outer shaft 52 covers the outer circumference of the inner shaft 50. The second spline portion 74 having the projections and recesses that are arranged alternately in the circumferential direction is provided on the inner circumferential surface of the through hole 72. The second spline portion 74 is provided in a substantially central part of the outer shaft 52 in the axial direction (the directions of arrows A and B). As illustrated in FIG. 3, the second spline portion 74 is in mesh with the first spline portion 68 provided on the inner shaft 50.

Preferably, the first and second spline portions 68 and 74 are each provided in a substantially central part of a corresponding one of the inner shaft 50 and the outer shaft 52 in the axial direction (the directions of arrows A and B).

A pair of a third mating part 76a and a fourth mating part 76b are provided at two respective ends of the through hole 72 at positions facing the first mating part 66a and the second mating part 66b, respectively, provided on the inner shaft 50. A diameter d1 (inside diameter) of the third mating part 76a provided at the end of the outer shaft 52 that is on the first side (facing the direction of arrow A) is larger than a diameter d2 (inside diameter) of the fourth mating part 76b provided at the end of the outer shaft 52 that is on the second side (facing the direction of arrow B) (d1>d2).

The tolerances for the diameters of the third mating part 76a and the fourth mating part 76b are set smaller than the tolerance for the diameter of the second spline portion 74. Furthermore, the tolerances for the diameters of the third mating part 76a and the fourth mating part 76b are set larger than the tolerances for the diameters of the first mating part 66a and the second mating part 66b that face the third mating part 76a and the fourth mating part 76b.

That is, gaps of predetermined lengths are provided between the first mating part 66a and the third mating part 76a (i.e., gap G1) and between the second mating part 66b and the fourth mating part 76b (i.e., gap G2), respectively. Accordingly, the inner shaft 50 is loosely fitted in the outer shaft 52 with the gaps interposed in the radial direction between the first mating part 66a and the third mating part 76a and between the second mating part 66b and the fourth mating part 76b, respectively. More specifically, the first mating part 66a of the inner shaft 50 is loosely fitted in the third mating part 76a of the outer shaft 52, whereby a first mating portion (loosely fitted portion or gap fitted portion) C1 is formed. Furthermore, the second mating part 66b of the inner shaft 50 is loosely fitted in the fourth mating part 76b of the outer shaft 52, whereby a second mating portion (loosely fitted portion or gap fitted portion) C2 is formed.

The outer shaft 52 has, on the outer circumference thereof, an increased-diameter portion 78 bulging in the radial direction at the end of the outer shaft 52 that is on the first side (facing the direction of arrow A). The increased-diameter portion 78 is provided with a detection element 82 projecting therefrom in the radial direction and to be detected by a resolver 80 provided on the casing 12. When the first rotor 30 rotates together with the outer shaft 52, the resolver 80 detects the detection element 82, whereby the number of revolutions of the first rotor 30 is detected. The first rotor 30 included in the motor 14 is secured, by press-fitting or the like, integrally to the outer circumference of the outer shaft 52 at a position on the second side with respect to the increased-diameter portion 78, i.e., in a substantially central portion. A cotter 84 and a cotter cover 86 are provided at the end of the outer shaft 52 that is on the second side, whereby the first rotor 30 is locked while being prevented from moving in the axial direction (the direction of arrow B).

The second rotor 38 of the generator 16 is secured to the outer circumference of the generator shaft 46. One end of the generator shaft 46 that is on the first side corresponding to the engine side (facing the direction of arrow A) is rotatably supported by a third bearing 90. The other end of the generator shaft 46 that is on the second side (facing the direction of arrow B) opposite the engine side is rotatably supported by a fourth bearing 92 in such a manner as for the generator shaft 46 to be rotatable relative to the casing 12.

The output shaft 22 has a fourth output gear 94 on the first side thereof (facing the direction of arrow A) corresponding to the engine side, and a second input gear 96 on the second side thereof opposite the first side. The second input gear 96 is in mesh with the second output gear 28 of the engine shaft 18 and the third output gear 56 of the outer shaft 52.

The motor 14 as a rotating electric machine according to the embodiment of the present application is basically configured as described above. A method of assembling the motor-generator shaft 20 will now be described with reference to FIGS. 4A to 4C.

Figure 4A:
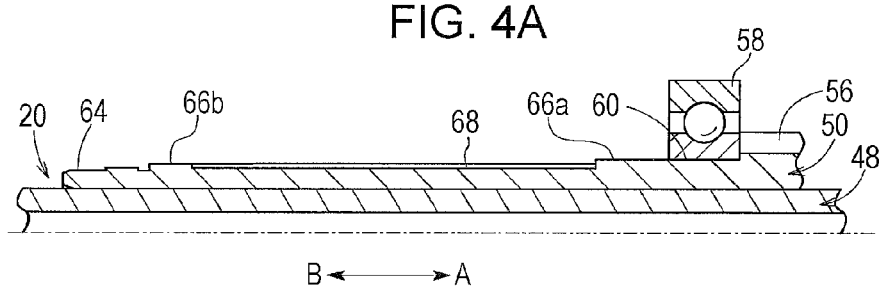
FIGS. 4A to 4C illustrate steps of attaching elements including an outer shaft and the first rotor to an inner shaft included in the motor-generator shaft illustrated in FIG. 2.

First, as illustrated in FIG. 4A, the first bearing 58 is press-fitted onto the outer circumference of the inner shaft 50 from the second side toward the first side (in the direction of arrow A) until the first bearing 58 comes into contact with a side face of the third output gear 56. Thus, the first bearing 58 is prevented from moving toward the first side (in the direction of arrow A) along the inner shaft 50 by the third output gear 56 and is positioned at the first-bearing-supported portion 60.

Figure 4B:
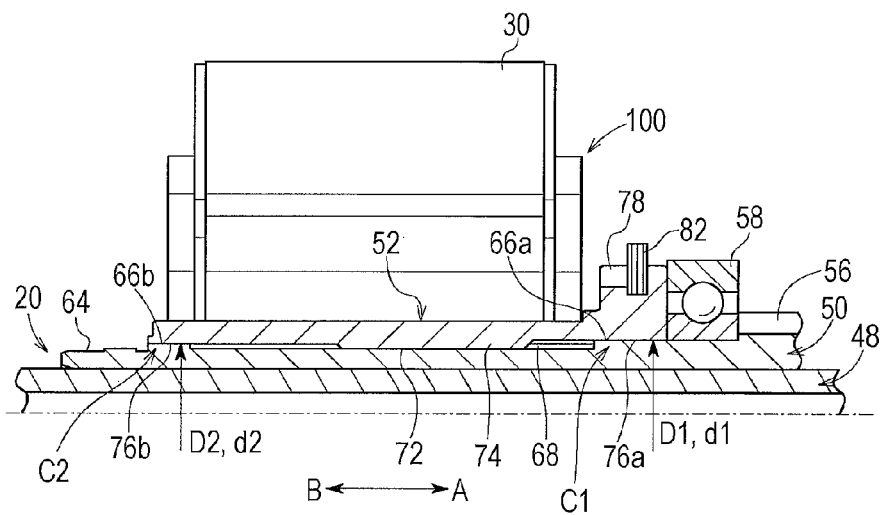

Meanwhile, a rotor unit 100 is prepared in advance by press-fitting the first rotor 30 onto the outer circumference of the outer shaft 52. Then, as illustrated in FIG. 4B, the outer shaft 52 included in the rotor unit 100 is fitted onto the outer circumference of the inner shaft 50 from the second side (facing the direction of arrow B) toward the first side. In this step, the second spline portion 74 of the outer shaft 52 is made to mesh with the first spline portion 68 of the inner shaft 50. Thus, the occurrence of relative rotational displacement between the inner shaft 50 and the outer shaft 52 about the axes thereof is prevented.

The diameter d1 of the third mating part 76a provided at the end of the outer shaft 52 that is on the first side (facing the direction of arrow A) is larger than the diameter d2 of the fourth mating part 76b provided at the end of the outer shaft 52 that is on the second side (facing the direction of arrow B) (d1>d2). Therefore, it is easy to fit the outer shaft 52 having the larger inside diameter at the end thereof on the first side onto the inner shaft 50 from the second side of the inner shaft 50. The outer shaft 52 into which the inner shaft 50 is inserted is moved along the inner shaft 50 until the increased-diameter portion 78 of the outer shaft 52 comes into contact with a side face of the first bearing 58, where the outer shaft 52 is stopped.

Since the first and second spline portions 68 and 74 are made to mesh with each other, the rotor unit 100 including the outer shaft 52 is prevented from being displaced relative to the inner shaft 50 in the rotating direction while being prevented from moving toward the first side (in the direction of arrow A) relative to the inner shaft 50. Meanwhile, the first and second mating parts 66a and 66b are fitted in the third and fourth mating parts 76a and 76b with respective gaps G1 and G2 interposed in the radial direction therebetween, whereby the first mating portion C1 and the second mating portion C2 are formed. The gaps provided in this state are smaller than the gap G3 (see FIG. 3) between the first and second spline portions 68 and 74.

Figure 4C:
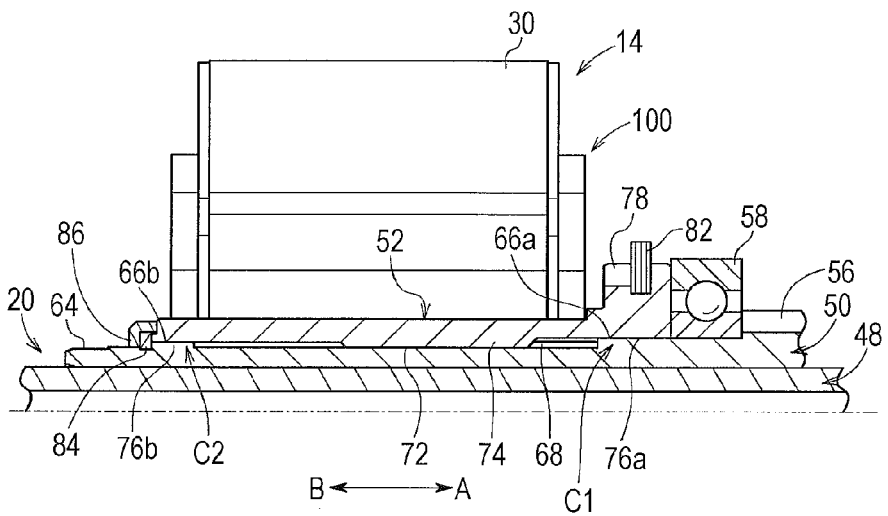

Lastly, as illustrated in FIG. 4C, the cotter 84, which has a ring shape, is attached onto the outer circumference of the inner shaft 50 in such a manner as to come into contact with the end of the outer shaft 52 that is on the second side. Subsequently, the cotter cover 86 is provided over the outer circumference of the cotter 84, whereby the outer shaft 52 is prevented from moving toward the second side (in the direction of arrow B) by the cotter 84. Thus, the rotor unit 100 including the outer shaft 52 is secured integrally to the outer circumference of the inner shaft 50, that is, the rotor unit 100 and the inner shaft 50 are assembled together.

The rotor unit 100 is prevented from moving in the axial direction (the directions of arrows A and B) and being displaced in the rotating direction relative to the inner shaft 50. Meanwhile, the first and second mating parts 66a and 66b are loosely fitted in the third and fourth mating parts 76a and 76b, respectively, forming the first and second mating portions C1 and C2, respectively. Thus, the rotor unit 100 and the inner shaft 50 are assembled together while movements in the radial direction relative to each other are prevented by the first and second mating portions C1 and C2.

According to the above embodiment, the motor-generator shaft 20 is press-fitted into the center of the first rotor 30 that forms a rotating electric machine; the motor-generator shaft 20 includes the inner shaft 50 and the outer shaft 52 provided around the outer circumference of the inner shaft 50 and to which the first rotor 30 is secured; the first and second mating parts 66a and 66b are provided on the outer circumference of the inner shaft 50; and the third and fourth mating parts 76a and 76b are provided on the inner circumference of the outer shaft 52. The gaps G1 and G2 between the first mating part 66a and the third mating part 76a and between the second mating part 66b and the fourth mating part 76b are smaller than the gap G3 between the first spline portion 68 of the inner shaft 50 and the second spline portion 74 of the outer shaft 52. Therefore, the outer shaft 52 is held relative to the inner shaft 50 with high accuracy in the radial direction by the first mating portion C1 in which the first mating part 66a is loosely fitted in the third mating part 76a and the second mating portion C2 in which the second mating part 66b is loosely fitted in the fourth mating part 76b.

In other words, since the inner circumference of the outer shaft 52 is held by the outer circumference of the inner shaft 50 at the first and second mating parts 66a and 66b and the third and fourth mating parts 76a and 76b, the first spline portion 68 and the second spline portion 74 are prevented from coming into contact with each other in the radial direction and are therefore prevented from receiving any loads.

Moreover, since the inner shaft 50 is rotatably supported by the first and second bearings 58 and 62, the outer shaft 52 is also supported in such a manner as to be rotatable together with the inner shaft 50. Accordingly, no bearings that support only the outer shaft 52 are necessary.

Consequently, compared with the known rotating electric machine that includes two separate bearings that support the inner shaft 50 and the outer shaft 52, respectively, the number of components included in the motor 14 is reduced. Correspondingly, the longitudinal size of the motor 14 in the axial direction, the weight of the motor 14, and the cost of manufacturing the motor 14 are reduced. Moreover, the number of steps of assembling the motor 14 is reduced.

Although the third output gear 56 is provided integrally at the end of the inner shaft 50 that is on the first side (facing the direction of arrow A), since the outer shaft 52 is separable from the motor-generator shaft 20, the first bearing 58 can be fitted onto the inner shaft 50 in the axial direction (the direction of arrow A) so as to be positioned between the third output gear 56 and the first rotor 30. Thus, the motor-generator shaft 20 including the inner shaft 50 is rotatably supported by the first bearing 58 without changing the shape of the casing 12 that holds the first bearing 58.

The inner shaft 50 and the outer shaft 52 have the first and second mating parts 66a and 66b and the third and fourth mating parts 76a and 76b, respectively, provided on both sides of the first and second spline portions 68 and 74 in the axial direction (the directions of arrows A and B). Therefore, if, for example, the center of the first rotor 30 secured to the outer shaft 52 is deflected while the first rotor 30 is rotating, the load acting in the radial direction is received by the pair of the first and second mating portions C1 and C2. Therefore, the occurrence of concentration of load on the first and second spline portions 68 and 74 or one of the first and second mating portions C1 and C2 is suppressed. Consequently, the durability of each of the inner shaft 50 and the outer shaft 52 is increased.

The diameter D1 of the first mating part 66a provided at the end of the inner shaft 50 that is on the first side (facing the direction of arrow A), i.e., the diameter d1 of the third mating part 76a of the outer shaft 52, is set larger than the diameter D2 of the second mating part 66b provided at the end of the inner shaft 50 that is on the second side, i.e., the diameter d2 of the fourth mating part 76b of the outer shaft 52. Meanwhile, the first spline portion 68 extends in the axial direction (the directions of arrows A and B) on the outer circumference of the inner shaft 50. Therefore, it is easy to fit the outer shaft 52 onto the inner shaft 50 from the second side toward the first side (in the direction of arrow A). Thus, the ease of assembly is increased.

The first and second spline portions 68 and 74 are provided on the inner circumferential side of the first rotor 30. Therefore, the torque generated by the rotation of the first rotor 30 is assuredly transmitted from the outer shaft 52 to the inner shaft 50 with no twists, owing to the spline fitting between the inner shaft 50 and the outer shaft 52.

The third and fourth mating parts 76a and 76b are provided at the two respective ends of the outer shaft 52 that are on the first side and the second side in the axial direction. Therefore, even if there are any errors in the press-fitting margins in the axial direction for the first rotor 30 and an end plate that holds the end face of the first rotor 30 at the position where the first rotor 30 is secured to the outer shaft 52, the outer shaft 52 is prevented from deforming nonuniformly in the axial direction at the third and fourth mating parts 76a and 76b. Hence, the load acting in the radial direction is received in a preferable manner by the third and fourth mating parts 76a and 76b.

The rotating electric machine according to the present application is not limited to the motor 14 according to the above embodiment. Needless to say, various other configurations can be alternatively employed in the above embodiment without departing from the scope of the present application.

According to an aspect of the embodiment, a rotating electric machine includes an inner-circumferential-side shaft having a gear that is provided integrally therewith, an outer-circumferential-side shaft provided on the outer circumferential side of the inner-circumferential-side shaft, and a rotor secured to the outer-circumferential-side shaft. The inner-circumferential-side shaft is rotatably supported by a bearing that is provided between the gear and the rotor. An outer circumference of the inner-circumferential-side shaft and an inner circumference of the outer-circumferential-side shaft are spline-fitted to each other at a spline-fitted portion. The outer-circumferential-side shaft has, on the inner circumference thereof, a loosely fitted portion that is fitted on the outer circumference of the inner-circumferential-side shaft with a gap of a predetermined length interposed therebetween. The gap is smaller than a gap provided at the spline-fitted portion between the inner-circumferential-side shaft and the outer-circumferential-side shaft.

The rotating electric machine according to the above aspect of the embodiment includes the outer-circumferential-side shaft to which the rotor is secured, and the inner-circumferential-side shaft that has the gear provided integrally therewith and is provided in the outer-circumferential-side shaft. The rotating electric machine has the spline-fitted portion where the inner circumference of the outer-circumferential-side shaft and the outer circumference of the inner-circumferential-side shaft are spline-fitted to each other. Furthermore, the inner circumference of the outer-circumferential-side shaft has the loosely fitted portion that is fitted on the outer circumference of the inner-circumferential-side shaft with the gap of the predetermined length interposed therebetween. Furthermore, the gap provided at the loosely fitted portion between the inner circumference of the outer-circumferential-side shaft and the outer circumference of the inner-circumferential-side shaft is smaller than the gap provided at the spline-fitted portion between the inner-circumferential-side shaft and the outer-circumferential-side shaft.

Since the outer-circumferential-side shaft is held relative to the inner-circumferential-side shaft with high accuracy in the radial direction by the loosely fitted portion, the outer-circumferential-side shaft is also rotatably supported by the bearing that supports the inner-circumferential-side shaft. Therefore, as long as the inner-circumferential-side shaft is supported by the bearing, there is no need to support the outer-circumferential-side shaft. That is, no bearing is necessary for supporting only the outer-circumferential-side shaft.

Consequently, compared with the known rotating electric machine that includes two separate bearings that support the inner-circumferential-side shaft and the outer-circumferential-side shaft, respectively, the number of components included in the rotating electric machine is reduced. Correspondingly, the longitudinal size of the rotating electric machine in the axial direction, the weight of the rotating electric machine, and the cost of manufacturing the rotating electric machine are reduced. Moreover, the number of steps of assembling the rotating electric machine is reduced.

Although the gear is provided integrally with the inner-circumferential-side shaft, since the outer-circumferential-side shaft that is provided on the outer circumferential side of the inner-circumferential-side shaft is separable from the inner-circumferential-side shaft, the bearing can be provided between the gear and the rotor in the axial direction. Hence, the inner-circumferential-side shaft and the outer-circumferential-side shaft can be rotatably supported by the bearing while the influence upon the arrangement of peripheral components that hold the bearing is reduced.

Furthermore, the loosely fitted portion is preferably provided on each of two sides of the spline-fitted portion in the axial direction. In such a case, if, for example, the center of the rotor secured to the outer-circumferential-side shaft is deflected while the rotor is rotating, the load acting in the radial direction is received in a preferable manner by the pair of the loosely fitted portions. Therefore, the occurrence of concentration of load on one of the loosely fitted portions is suppressed. Consequently, the durability of the outer-circumferential-side shaft is increased.

Furthermore, the loosely fitted portion provided on one side of the outer-circumferential-side shaft in the axial direction preferably has a larger diameter than the loosely fitted portion provided on the other side of the outer-circumferential-side shaft in the axial direction. Meanwhile, the outer circumference of the inner-circumferential-side shaft preferably has splines provided at the spline-fitted portion and extending in the axial direction. In such a case, it is easy to fit the outer-circumferential-side shaft onto the inner-circumferential-side shaft from the end of the inner-circumferential-side shaft that is on the other side toward the end of the inner-circumferential-side shaft that is on the one side. Thus, the ease of assembly is increased.

Furthermore, the spline-fitted portion is preferably provided on an inner-circumferential side of the rotor. In such a case, a torque generated by the rotation of the rotor is assuredly transmitted from the outer-circumferential-side shaft to the inner-circumferential-side shaft with no twists, owing to the spline fitting between the inner-circumferential-side shaft and the outer-circumferential-side shaft.

Furthermore, the loosely fitted portion is preferably provided at each of two ends of the outer-circumferential-side shaft that are on one side and the other side in the axial direction. In such a case, even if there are any errors in the press-fitting margins in the axial direction for the rotor and an end plate that holds the end face of the rotor at the position where the rotor is secured to the outer-circumferential-side shaft, the outer-circumferential-side shaft is prevented from deforming nonuniformly in the axial direction at the loosely fitted portions. Hence, the load acting in the radial direction is received in a preferable manner by the loosely fitted portions.

Obviously, numerous modifications and variations of the present invention are possible in light of the above teachings. It is therefore to be understood that within the scope of the appended claims, the invention may be practiced otherwise than as specifically described herein.

What is claimed is:

1. A rotating electric machine comprising:
   an inner-circumferential-side shaft having a gear that is provided integrally therewith, the inner-circumferential-side shaft being monolithic;
   an outer-circumferential-side shaft provided on the outer circumferential side of the inner-circumferential-side shaft;
   a rotor secured to the outer-circumferential-side shaft, the inner-circumferential-side shaft being directly rotatably supported by a bearing that is provided between the gear and the rotor, an outer circumference of the inner-circumferential-side shaft and an inner circumference of the outer-circumferential-side shaft being spline-fitted to each other at a spline-fitted portion, the outer-circumferential-side shaft having a gap fitted portion that is provided on the inner circumference of the outer-circumferential-side shaft and that is fitted on the outer circumference of the inner-circumferential-side shaft with a first gap having a predetermined length provided between the gap fitted portion and the outer circumference of the inner-circumferential-side shaft, the first gap being smaller than a second gap provided at the spline-fitted portion between the inner-circumferential-side shaft and the outer-circumferential-side shaft; and
   a stator facing an outer circumference of the rotor,
   wherein the gap fitted portion includes
   a first gap fitted portion provided on a first side of the spline-fitted portion in an axial direction of the inner-circumferential-side shaft, and
   a second gap fitted portion provided on a second side of the spline-fitted portion in the axial direction, the second side being opposite to the first side with respect to the spline-fitted portion in the axial direction, and
   wherein the first gap fitted portion and the second gap fitted portion are each provided on the inner circumference of the outer-circumferential-side shaft and directly face the outer circumference of the inner-circumferential-side shaft.

2. The rotating electric machine according to claim 1,
   wherein the first gap fitted portion has a diameter larger than a diameter of the second gap fitted portion, and
   wherein the outer circumference of the inner-circumferential-side shaft has splines provided at the spline-fitted portion and extending in the axial direction.

3. The rotating electric machine according to claim 1, wherein the spline-fitted portion is provided on an inner-circumferential side of the rotor.

4. The rotating electric machine according to claim 1,
   wherein the first gap fitted portion is provided at a first end of the outer-circumferential-side shaft, and
   wherein the second gap fitted portion is provided at a second end of the outer-circumferential-side shaft, the second end being opposite to the first side with respect to the outer-circumferential-side shaft.

5. The rotating electric machine according to claim 1,
   wherein the inner-circumferential-side shaft includes a bearing-supported portion provided on the outer circumference of the inner-circumferential-side shaft and supported by the bearing, and
   wherein one of the first gap fitted portion and the second gap fitted portion is provided between the bearing-supported portion and the spline-fitted portion in the axial direction of the inner-circumferential-side shaft.

6. The rotating electric machine according to claim 1,
   wherein the first gap fitted portion on the outer-circumferential-side shaft directly faces the inner-circumferential-side shaft in a radial direction of the inner-circumferential-side shaft, and
   wherein the second gap fitted portion on the outer-circumferential-side shaft directly faces the inner-circumferential-side shaft in the radial direction of the inner-circumferential-side.

7. A rotating electric machine comprising: an inner-circumferential-side shaft having a gear that is provided integrally therewith;
   an outer-circumferential-side shaft provided on the outer circumferential side of the inner-circumferential-side shaft;
   a ball bearing directly rotatably supporting the inner-circumferential-side shaft;
   a rotor secured to the outer-circumferential-side shaft, the ball bearing being provided between the gear and the rotor, an outer circumference of the inner-circumferential-side shaft and an inner circumference of the outer-circumferential-side shaft being spline-fitted to each other at a spline-fitted portion, the outer-circumferential-side shaft having a gap fitted portion that is provided on the inner circumference of the outer-circumferential-side shaft and that is fitted on the outer circumference of the inner-circumferential-side shaft with a first gap having a predetermined length provided between the gap fitted portion and the outer circumference of the inner-circumferential-side shaft, the first gap being smaller than a second gap provided at the spline-fitted portion between the inner-circumferential-side shaft and the outer-circumferential-side shaft; and
   a stator facing an outer circumference of the rotor, wherein the gap fitted portion is provided on the inner circumference of the outer-circumferential-side shaft and directly faces the outer circumference of the inner-circumferential-side shaft.

8. The rotating electric machine according to claim 7, wherein the gap fitted portion includes
- a first gap fitted portion provided on a first side of the spline-fitted portion in an axial direction of the inner-circumferential-side shaft, and
- a second gap fitted portion provided on a second side of the spline-fitted portion in the axial direction, the second side being opposite to the first side with respect to the spline-fitted portion in the axial direction.

9. The rotating electric machine according to claim 8,
wherein the first gap fitted portion has a diameter larger than a diameter of the second gap fitted portion, and
wherein the outer circumference of the inner-circumferential-side shaft has splines provided at the spline-fitted portion and extending in the axial direction.

10. The rotating electric machine according to claim 8,
wherein the first gap fitted portion on the outer-circumferential-side shaft directly faces the inner-circumferential-side shaft in a radial direction of the inner-circumferential-side shaft, and
wherein the second gap fitted portion on the outer-circumferential-side shaft directly faces the inner-circumferential-side shaft in the radial direction of the inner-circumferential-side.

11. The rotating electric machine according to claim 7, wherein the spline-fitted portion is provided on an inner-circumferential side of the rotor.

12. The rotating electric machine according to claim 7, wherein the gap fitted portion includes
- a first gap fitted portion provided at a first end of the outer-circumferential-side shaft, and
- a second gap fitted portion provided at a second end of the outer-circumferential-side shaft, the second end being opposite to the first end with respect to the outer-circumferential-side shaft.

13. The rotating electric machine according to claim 7,
wherein the inner-circumferential-side shaft includes a bearing-supported portion provided on the outer circumference of the inner-circumferential-side shaft and supported by the ball bearing, and
wherein the gap fitted portion is provided between the bearing-supported portion and the spline-fitted portion in an axial direction of the inner-circumferential-side shaft.

14. The rotating electric machine according to claim 7,
wherein the inner-circumferential-side shaft is monolithic.

15. The rotating electric machine according to claim 7,
wherein the ball bearing supports the outer circumferential side of the inner-circumferential-side shaft.

* * * * *